United States Patent [19]

Dickinson

[11] 3,987,290

[45] Oct. 19, 1976

[54] CALCULATOR APPARATUS FOR DISPLAYING DATA IN ENGINEERING NOTATION

[75] Inventor: Peter D. Dickinson, Monte Sereno, Calif.

[73] Assignee: Hewlett-Packard Company, Palo Alto, Calif.

[22] Filed: May 19, 1975

[21] Appl. No.: 578,775

[52] U.S. Cl. .................................. 235/156; 235/154
[51] Int. Cl.$^2$ ............................................. G06F 5/02
[58] Field of Search ............ 235/156, 164, 160, 168, 235/92 CV, 154, 155; 340/324 R, 172.5; 445/1

[56] References Cited
UNITED STATES PATENTS

| | | | |
|---|---|---|---|
| 2,538,636 | 1/1951 | Williams | 235/61 |
| 3,043,509 | 7/1962 | Brown et al. | 235/156 |
| 3,210,737 | 10/1965 | Perry et al. | 340/172.5 |
| 3,236,999 | 2/1966 | Hertz | 235/164 |
| 3,760,171 | 9/1973 | Wang et al. | 235/156 |
| 3,829,673 | 8/1974 | Bouton, Jr. et al. | 235/164 |

Primary Examiner—Charles E. Atkinson
Attorney, Agent, or Firm—Roland I. Griffin; Robert S. Hulse

[57] ABSTRACT

Digital data in floating-point notation is arithmetically formatted for display in engineering notation with an exponent that is always a multiple of three and a mantissa having a decimal point. The formatting is performed under control of a routine stored in a read-only memory (ROM) of a data processing unit.

8 Claims, 6 Drawing Figures

CALCULATOR APPARATUS FOR DISPLAYING DATA IN ENGINEERING NOTATION

BACKGROUND OF THE INVENTION

Many known digital data processing devices such as electronic calculators compute and display data in either fixed-point or floating-point notation, as shown in the examples below:

| Fixed-Point | Floating-Point |
| --- | --- |
| 364.05 | 3.6405 +2 |
| −364.05 | −3.6405 +2 |
| .036405 | 3.6405 −2 |
| .036405 | −3.6405 −2 |

An electronic calculator of this type is described in the literature (see, for example, Hewlett-Packard Company Journal, Volume 20, No. 1, September 1968).

Floating-point notation is often used instead of fixed-point notation in processing and displaying numerical data because the number of bits or digit places required to display large numbers in floating-point notation may be substantially less than the number of bits or digit places required to display similar large numbers in fixed-point notation. However, floating-point notation is often inconvenient for users making engineering, scientific or other measurements. The reason for this inconvenience is that many of the units measured such as millivolts, megahertz and the like are commonly represented in engineering notation (i.e., in multiples of 1,000 requiring an exponent that is a multiple of three). Users of devices that display data in floating-point format, therefore, often are compelled to mentally or manually rescale the data.

A computing counter (see Hewlett-Packard Company Journal, Volume 20, No. 9, May 1969) has been developed that displays data in engineering notation with the exponent expressed in alphabetic form rather than in numeric form, such as $f$ in place of −15, p in place of −12, n in place of −9, $\mu$ in place of −6, $m$ in place of −3, $k$ in place of +3, M in place of +6, G in place of +9, and T in place of +12. This device, however, is limited to displaying only those numeric quantities for which there exists a commonly accepted alphabetic exponent notation. This device is also limited in the range of data that it can display because the size of the exponent display area is limited, and would be unduly large if required to contain all of the alphabetic characters necessary to represent every exponent that is a multiple of three, for example, in the range −99 to +99.

In performing certain measurements using digital data processing devices such as calculators, oscilloscopes, counters and the like, it is undesirable to be burdened with the inconvenience of rescaling floating-point data and the probability of error that such rescaling affords. It is also undesirable to be limited to displaying only data for which there exists an alphabetic exponent notation, thereby not being able to display very large or very small quantities such as $10^{33}$ or $10^{-33}$ for which there are no commonly accepted alphabetic exponent notations.

SUMMARY OF THE INVENTION

Thus, in accordance with the illustrated preferred embodiment of the present invention, there is provided an electronic calculator including data storage registers, an arithmetic unit or adder, a read-only memory (ROM), and a routine stored in the ROM for formatting floating-point data in the range from $\pm 10^{-99}$ to $\pm 10^{99}$ for display in engineering notation. The floating-point data to be formatted is entered into the data registers which serve with the adder, under control of the formatting routine, as a formatting apparatus for formatting data into engineering notation for display by an LED (light-emitting diode) output display unit.

DESCRIPTION OF THE PREFERRED EMBODIMENT

Figure 1:
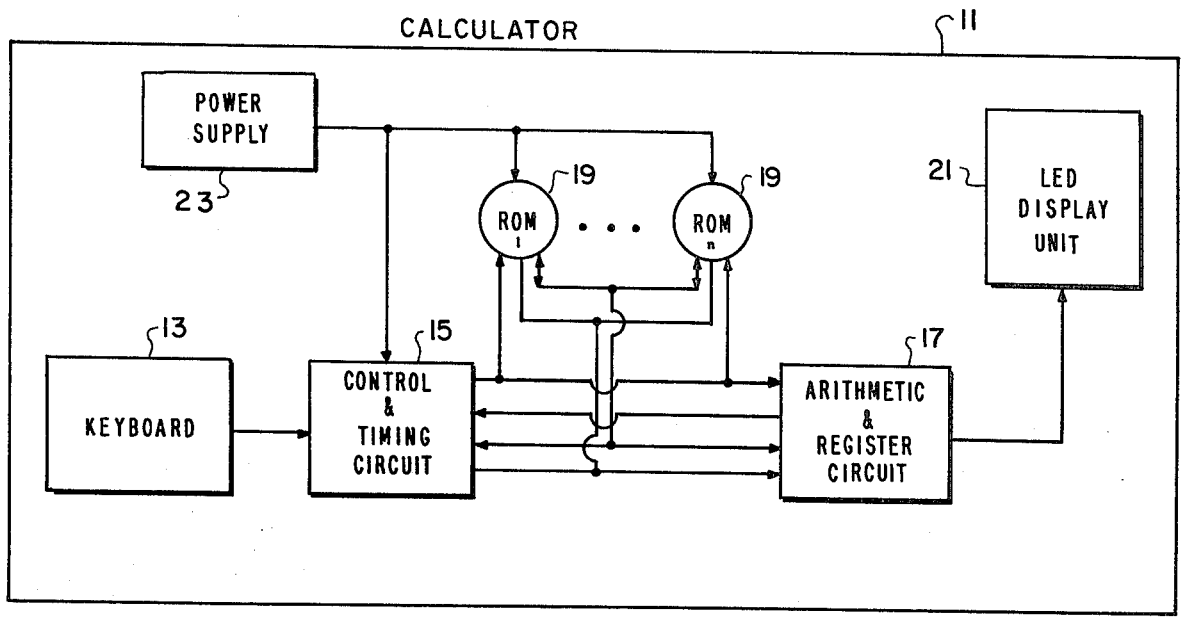
FIG. 1 is a block diagram of a conventional electronic calculator.

Referring to FIG. 1, there is represented a conventional electronic calculator 11, including a keyboard input unit 13, a control and timing circuit 15, an arithmetic and register circuit 17, at least one read-only memory (ROM) 19, an LED output display unit 21, and a power supply 23. This calculator and the aforementioned elements thereof may be constructed and operated in the same manner shown and described in detail in U.S. Pat. No. 3,863,060 entitled "General Purpose Calculator with Capability for Performing Interdisciplinary Business Calculations," issued Jan. 28, 1975 to France Rode, et al., and incorporated by reference herein (see, for example, FIGS. 2, 4–6 and 10, and the associated descriptions thereof in the referenced patent).

Figure 2:
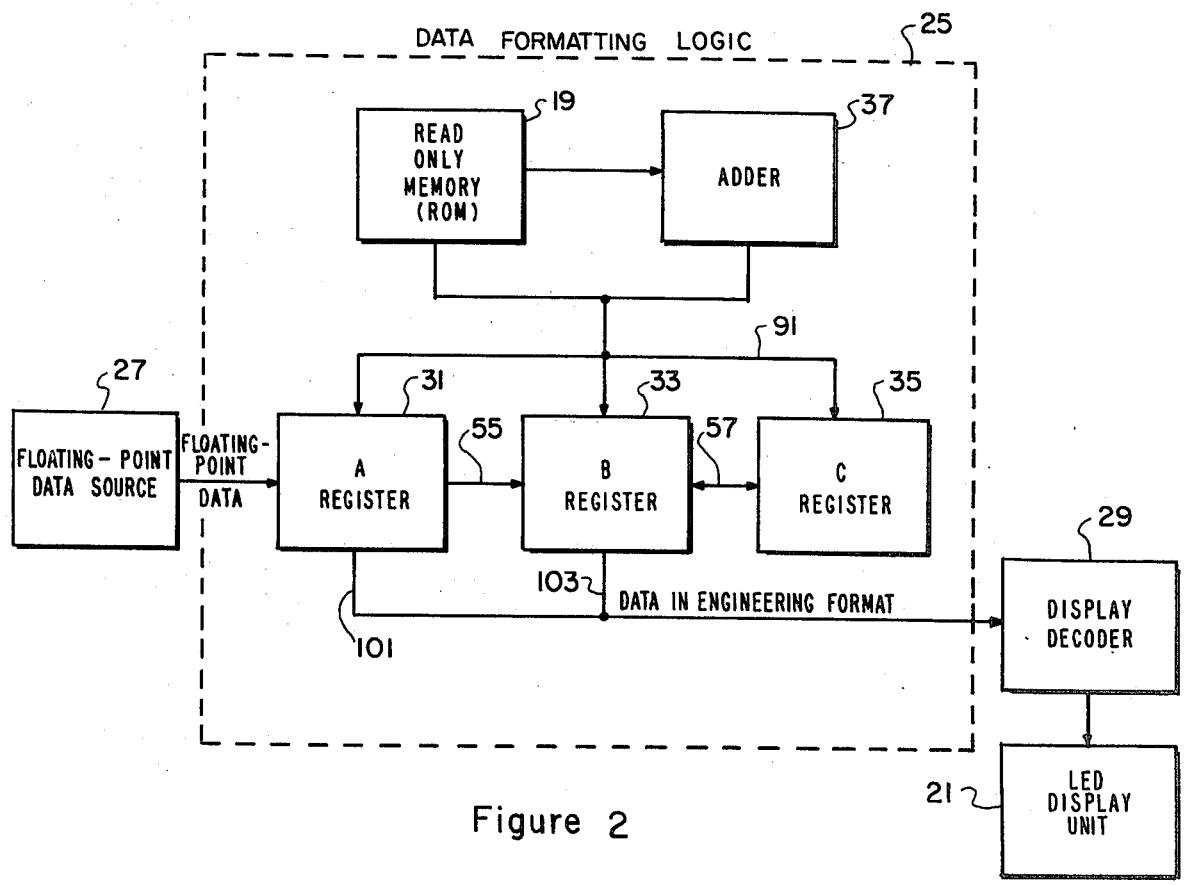
FIG. 2 is a block diagram of a display system employed in the calculator of FIG. 1 in accordance with the preferred embodiment of this invention to format floating-point data into engineering notation and to display the formatted data.

Referring now to FIG. 2 herein, there is shown a display system employed in the calculator 11 of FIG. 1 in accordance with the preferred embodiment of this invention to format floating-point data into engineering notation and to display the formatted data. This display system includes data formatting logic 25 for converting floating-point data received from a source 27 within the calculator 11, such as from one of the registers of the arithmetic and register circuit 17, to engineering notation for display by the LED output display unit 21. The data formatting logic 25 includes A, B and C data registers 31-35 of the arithmetic and register circuit 17. It also includes an adder 37 of the arithmetic and register circuit 17 and further includes a data formatting routine stored in a ROM 19. The data converted to engineering notation by the data formatting logic 25 is supplied to a display decoder 29 of the arithmetic and register circuit 17 which decodes the data for display by the LED display unit 21.

Figure 3:
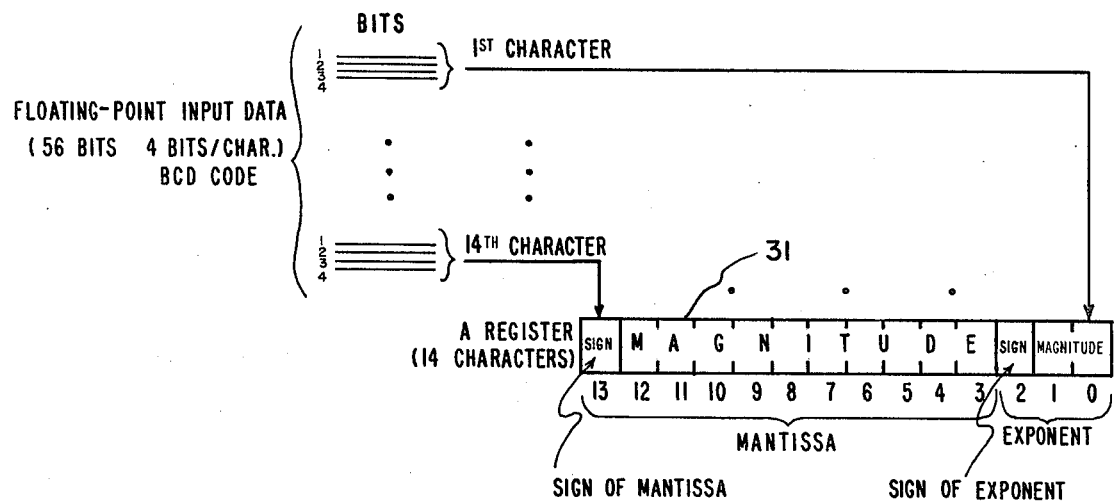
FIG. 3 is a diagrammatic illustration of the A register of the system of FIG. 2 and of the manner in which data is input into this register.

FIG. 3 shows the format of the A register 31 and the manner in which data in standard floating-point form is entered into the A register. Each floating-point value is represented by fifty-six data bits, for a total of fourteen data characters (four bits per character).

Figure 4:
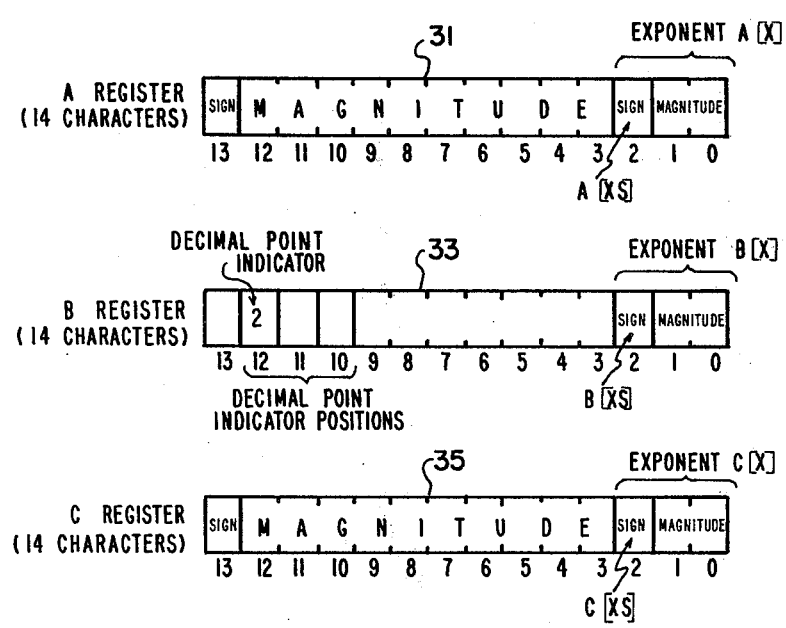
FIG. 4 is a diagrammatic illustration of the A, B, and C registers of the system of FIG. 2.

FIG. 4 shows the format of the A register 31 in relation to the B and C registers 33 and 35. Whenever floating-point data is input into the A register 31, this data is also stored in the C register 35, and the twelfth character of the B register 33 is set to two indicating the presence of a decimal point at the twelfth character position of the input data stored in the A and C registers. If the exponent portions A[X] and C[X] of the floating-point data stored in the A and C registers are negative, the magnitude of that exponent is converted to tens complement form prior to processing. For example, an exponent of −95 is converted to −05 prior to processing. Arithmetic operations including compare, subtract and shift operations are then performed upon the stored floating-point data so as to format that data into engineering notation for display. This formatting is performed by the A, B, and C registers 31-35 and the adder 37, under control of the data formatting routine stored in the ROM 19.

Figure 5:
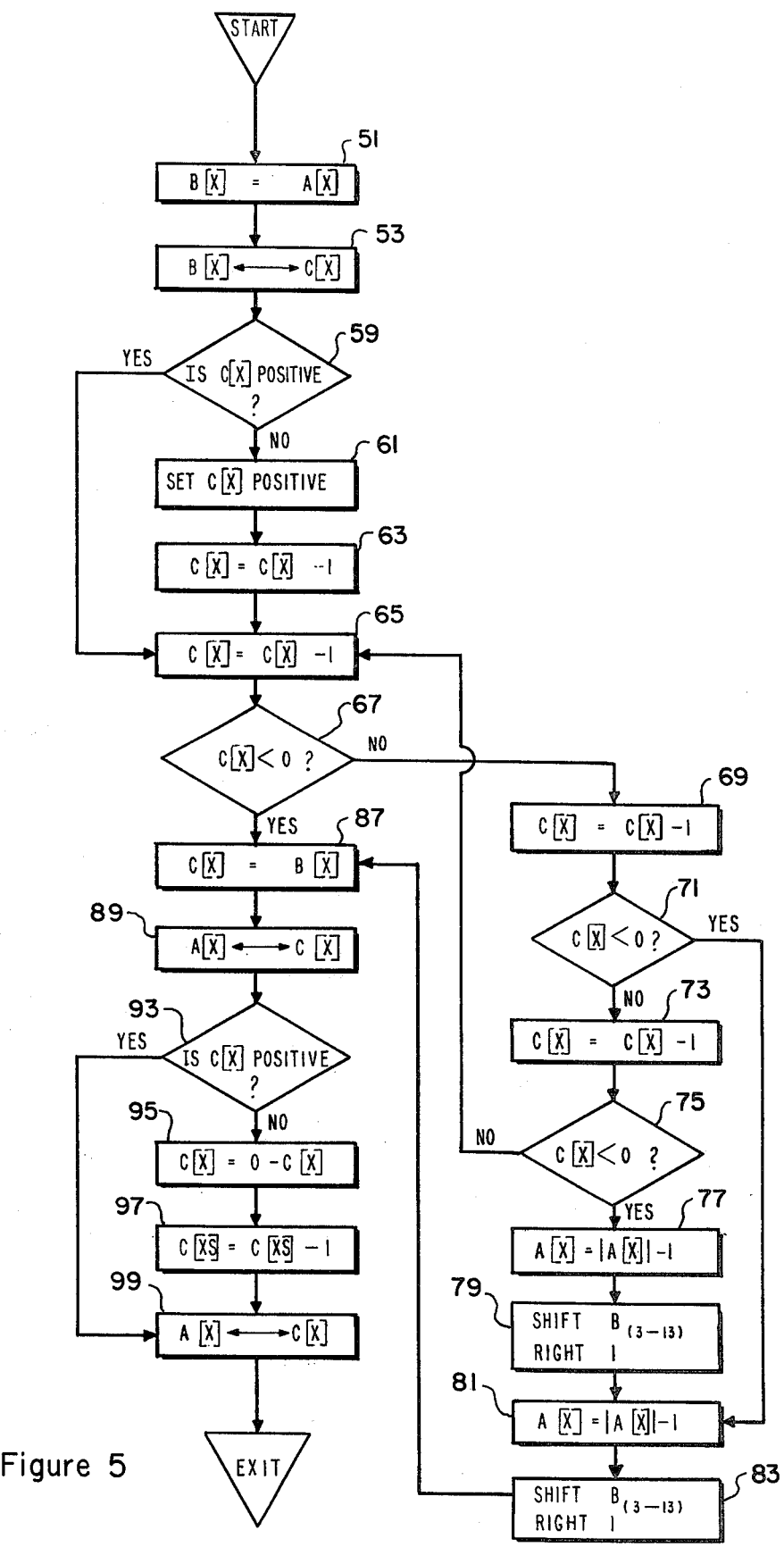
FIG. 5 is a logic flow diagram of the formatting routine stored in a ROM of the system of FIG. 2.

The data formatting operation performed under the control of the data formatting routine is disclosed in the logic flow diagram of FIG. 5. A list of the instructions comprising the routine is shown in Table 1 below. The instructions in the table are provided with numbers corresponding to the blocks of FIG. 5. The operations shown in the blocks represent the instructions of the table in simplified form. Hereinafter, execution of the blocks in FIG. 5 means execution of the operations shown in those blocks.

31 is additionally stored in the exponent field B[X] of the B register 33 via line 55 of FIG. 2. Thereafter, as indicated by block 53, the contents of the exponent field B[X] of the B register 33 and the contents of the exponent field C[X] of the C register 35 are exchanged via line 57 of FIG. 2. The exponent C[X] is then tested, as indicated by block 59, to determine if it is positive or negative. If the exponent C[X] is negative (indicated by the exponent sign C[XS]    O), it is made positive by setting C[XS] = 0 as indicated by block 61 and is decremented as shown by block 63, after which block 65 is executed as described below. However, if the exponent C[X] is found to be positive, block 65 is executed immediately.

To determine the extent to which the exponent C[X] differs from being an even multiple of three, the decrementing and testing operations of blocks 65, 67, 69, 71, 73 and 75 are executed consecutively, until the exponent C[X] becomes less than zero. Execution of block 65 decrements the exponent C[X] each first, fourth, seventh and like subsequent times so that if the exponent C[X] is originally an even multiple of three, only an execution of block 65 (not block 69 or 73) will first cause the exponent C[X] to be decremented to less than zero. This less-than-zero condition is detected by the testing operation of block 67. Likewise, execution of block 69 decrements the exponent C[X] each second, fifth, eighth and like subsequent times so that if the exponent C[X] is originally a multiple of three plus one, only an execution of block 69 will first cause the exponent C[X] to be decremented to less than zero. This less-than-zero condition is detected by the testing operation of block 71. Similarly, if the exponent C[X] is originally a multiple of three plus two, only an execution of block 73 will first cause the exponent C[X] to be decremented to less than zero. This less-than-zero

TABLE 1

| | Object Program | | | Flow Chart | | |
|---|---|---|---|---|---|---|
| Step Numbers | ROM Address | ROM Code | ROM Subroutine Address | Block Numbers | Labels | Program Instructions |
| 0 | L10000: | .1..1.1.1. | | 51 | ENG : | A → B[X] |
| 1 | L10001: | 1....1.1.1. | | 53 | | B EXCHANGE C[X] |
| 2 | L10002: | .11.111.1. | | 59 | | IF C[XS] = 0 |
| 3 | L10003: | .....11.11 | → L0006 | | | THEN GO TO ENG1 |
| 4 | L10004: | ..11.11.1. | | 61 | | 0 → C[XS] |
| 5 | L10005: | .1.11.1.1. | | 63 | | C - 1 → C[X] |
| 6 | L10006: | .1.11.1.1. | | 65 | ENG1 : | C - 1 → C[X] |
| 7 | L10007: | ...1....11 | → L0020 | 67 | | IF NO CARRY GO TO ENG2 |
| 8 | L10010: | ..1....1.1. | | 87 | ENG5 : | B → C[X] |
| 9 | L10011: | 111.1.1.1. | | 89 | SCI5 : | A EXCHANGE C[X] |
| 10 | L10012: | .11.111.1. | | 93 | | IF C[XS] = 0 |
| 11 | L10013: | .....111.11 | → L0016 | | | THEN GO TO SCI3 |
| 12 | L10014: | ..1.1.1.1. | | 95 | | 0 - C → C[X] |
| 13 | L10015: | .1.1111.1. | | 97 | | C - 1 → C[XS] |
| 14 | L10016: | 111.1.1.1. | | 99 | SCI3 : | A EXCHANGE C[X] |
| 15 | L10017: | ...11.1.11 | → L0032 | | | GO TO EXIT |
| 16 | L10020: | .1.11.1.1. | | 69 | ENG2 : | C - 1 → C[X] |
| 17 | L10021: | ...1..1111 | → L0023 | 71 | | IF NO CARRY GO TO ENG3 |
| 18 | L10022: | ...1.11111 | → L0027 | | | GO TO ENG4 |
| 19 | L10023: | .1.11.1.1. | | 73 | ENG3 : | C - 1 → C[X] |
| 20 | L10024: | .....11.11 | → L0006 | 75 | | IF NO CARRY GO TO ENG1 |
| 21 | L10025: | 11.11.1.1. | | 77 | | A - 1 → A[X] |
| 22 | L10026: | 1.1.....11. | | 79 | | SHIFT RIGHT B[M] |
| 23 | L10027: | 11.11.1.1. | | 81 | ENG4 : | A - 1 → A[X] |
| 24 | L10030: | 1.1.....11. | | 83 | | SHIFT RIGHT B[M] |
| 25 | L10031: | .....1....11 | → L0010 | | | GO TO ENG5 |
| 26 | L10032: | .......... | | | EXIT : | NO OPERATION |

In FIG. 5 and Table 1, the variables A[X], B[X] and C[X] used in the formatting routine represent bits of the exponent portions or fields of the A, B, and C registers 31-35 of FIG. 4. As indicated by block 51, the contents of the exponent field A[X] of the A register condition is detected by the testing operation of block 75. Thus, in summary execution of blocks 65 and 67 determines if the exponent C[X] is an even multiple of three, execution of blocks 69 and 71 determines if the exponent C[X] differs by one from being a multiple of three, and execution of blocks 73 and 75 determines if the exponent C[X] differs by two from being a multiple of three.

If the exponent C[X] differs by one from being a multiple of three, as determined by the testing operation of block 71, the magnitude of the exponent in the A register 31 is decremented by one so as to make it an even multiple of three as shown by block 81, and the decimal point of the mantissa, represented by a two at the twelfth character position of the B register 33, is adjusted accordingly (i.e., shifted right one position to the eleventh character position). This shifting operation is performed by execution of block 83, after which block 87 is executed as described hereinafter. If the exponent C[X] differs by two from being a multiple of three, as determined by the testing operation at block 75, the magnitude of the exponent is decremented by two (i.e., decremented by one a first time as indicated by block 77 and decremented by one a second time as indicated by block 81), and the decimal point indicator at the twelfth character position of the B register 33 is shifted right two positions to the tenth character position of the B register 33. This shifting operation is performed by the executions of blocks 79 and 83. Execution of block 79 causes a shift right of one character position and execution of block 83 causes another shift right of one character position, following which, block 87 is executed as described hereinafter. In the exponent C[X] is an even multiple of three as determined by the testing operation at block 67, no decrementing or shifting operation is performed, and the operation at block 87 is performed immediately after the testing operation. Upon the execution of block 87, the exponent B[X] of the B register 33 is temporarily stored in the exponent field C[X] of the C register 35 via line 57 of FIG. 2, after which as shown in block 89, this field C[X] and the exponent field A [X] of the A register 31 are exchanged via line 91 of FIG. 2. The exponent C[X] is then tested as shown by block 93 to determine if it is positive. If positive, block 99 is executed next; if negative, block 95 is executed, as described below. A negative exponent C[X] indicates that the magnitude of the exponent is in tens complement form and must be reconverted to noncomplemented form. This reconversion or recomplementing operation is performed in two steps, at blocks 95 and 97. The operation performed at block 95 is a tens complementing operation which results in the reconversion of the magnitude of the exponent C[X] from complemented form to noncomplemented form, and also results in the conversion of the sign C[XS] of the exponent C[X] from noncomplemented form to complemented form. Thereafter, the operation indicated by block 97 is performed which reconverts the sign C[XS] of the exponent C[X] from complemented form to noncomplemented form, thereby restoring to the exponent C[X] the sign it had prior to the complementing operation. Thereafter, as block 99 shows, the exponent C[X] and the exponent A [X] are exchanged via line 91 of FIG. 2. At this point, the A register 31 contains the input data formatted in engineering form, with an exponent field A[X] expressed as a multiple of three, and the B register 33 contains a two in the twelfth, eleventh or tenth character position representing the corresponding position of the decimal point. This formatted data is then output from the A and B registers via lines 101 and 103 of FIG. 2, and supplied to the display decoder 29 for display by the display unit 21.

Table 2 illustrates how input data of the form:

+2.345678900-95 is formatted into engineering notation by the data formatting routine shown in FIG. 5. Individual entries in the table correspond to the individual blocks of the logic flow diagram of the routine. The mantissa 2.345678900 is stored in the mantissa portion (character positions 3-13) of the A and C registers 31 and 35 of FIG. 4. The magnitude 95 of the exponent −95 is converted to 05 (tens complement form) and the converted exponent −05 is stored in the exponent portions A[X] and C[X] of the A and C registers 31 and 35 of FIG. 4 prior to processing.

TABLE 2

| FLOW CHART BLOCK NUMBERS | VALUES ASSUMED BY PROGRAM VARIABLES | |
|---|---|---|
| 51 | B[X] = −05 | |
| 53 | C[X] = −05 | B[X] = −05 |
| 61 | C[X] = +05 | |
| 63 | C[X] = +04 | |
| 65 | C[X] = +03 | |
| 69 | C[X] = +02 | |
| 73 | C[X] = +01 | |
| 65 | C[X] = +00 | |
| 69 | C[X] = −99 | |
| 81 | A[X] = −04 | |
| 83 | B(3_13) = 00200000000 | |
| 87 | C[X] = −05 | |
| 89 | A[X] = −05 | C[X] = −04 |
| 95 | C[X] = +96 | |
| 97 | C[X] = −96 | |
| 99 | A[X] = −96 | C[X] = −05 |

The last entry in the table (block 99) shows an exponent value of −96. The input exponent −95 is thus converted to −96, a multiple of three. Correspondingly, the decimal point of the mantissa is shifted right one position, effectively changing the mantissa from +2.345678900 to +23.45678900. This decimal point shift is shown at block 83 of the table, which shows a 2 (the decimal point indicator) not at its original twelfth character position but at the eleventh character position, which is one place to the right of its original position. Upon examination of the formatted data in the A and B registers, therefore, this output data for display is shown to be:

23.45678900-96

The number of digits of the mantissa to the right of the decimal point may be variable. Any integer number from 0 to 8 may be specified by the user to indicate the number of digits, i.e., the extent of rounding, of the fractional portion of the mantissa. This rounding operation is performed in the same manner as described in the subsection entitled "Rounding" of the section entitled "BASIC INSTRUCTIONS" in column 72 of the aforementioned U.S. Pat. No. 3,863,060.

Figure 6:
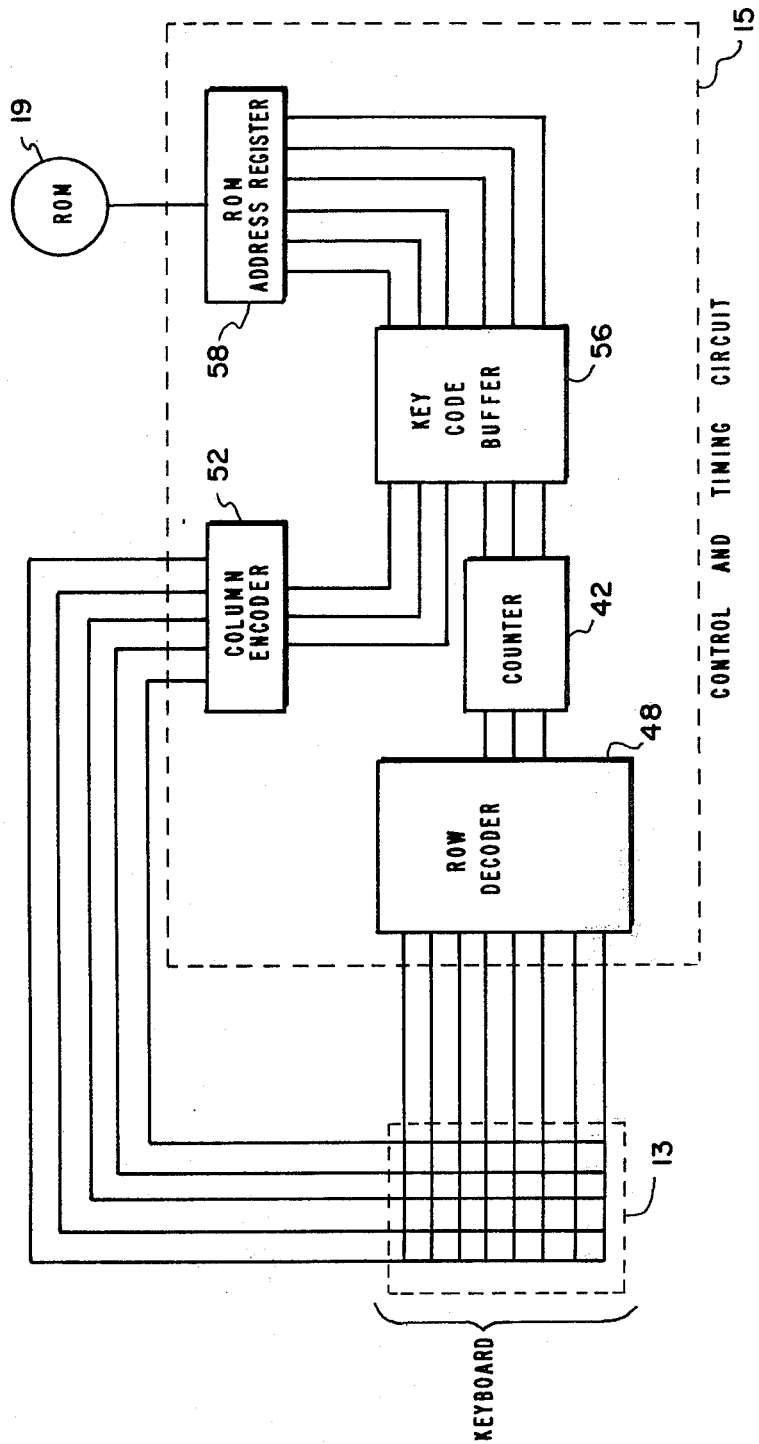
FIG. 6 is a more detailed block diagram of the keyboard and the control and timing circuit of the calculator of FIG. 1.

The user has the choice of selecting either engineering notation or floating-point notation for displaying data. FIG. 6 illustrates how this choice is implemented. The user specifies engineering notation by depressing or actuating a key included for this purpose in the keyboard 13 of the calculator. The control and timing circuit 15 scans the matrix of keys constituting the keyboard 13 in search of a depressed key. In the scanning operation, the contents of a three-bit counter 43 of the control and timing circuit 15 is input to a row decoder 48 of the same circuit for selecting the rows of the keyboard 13. As the counter 42 is incremented, the row decoder 48 sequentially selects a row of the keyboard 13 until all rows are selected, following which the counter 42 is restarted and the selection process is repeated. The selection of a row containing a depressed key results in an input signal to a column encoder 52 of the control and timing circuit via the column containing the depressed key. The column encoder 52 encodes the input signal into three bits identifying the column containing the depressed key. These three bits and the three bits of the counter 42 together define the location (column and row coordinates, respectively) of the depressed key. At the time the depressed key is detected, the contents of the counter 42 and the contents of the encoder 52 are saved in a key code buffer 56 of the control and timing circuit. The contents of the key code buffer 56 is then transferred to a ROM address register 58 of the same circuit and becomes the starting address of the data formatting routine stored in the ROM 19 which services that particular key for selecting engineering notation. It should be noted that engineering notation may also be made selectable-by-default, i.e., data is displayed in engineering notation unless the user selects some other format. If a format other than engineering notation is selected, the data formatting routine is bypassed and not executed.

I claim:

1. An apparatus for displaying data in engineering notation, said apparatus comprising:
   storage means for receiving and storing data to be displayed in engineering notation;
   processing means coupled to said storage means for formatting the stored data into engineering notation having a mantissa and an exponent that is always a multiple of three;
   display means coupled to said storage and processing means for displaying the formatted data.

2. The apparatus of claim 1 wherein said storage means comprises at least one register for storing the mantissa and the exponent.

3. The apparatus of claim 1 wherein said processing means includes a format controller having a routine stored therein for controlling the formatting operation.

4. The apparatus of claim 1 including:
   keyboard means for selecting engineering notation as the format in which data is to be displayed;
   said keyboard means being coupled to said processing means for inputting data thereto in response to keyboard entries.

5. The apparatus of claim 1 wherein the mantissa produced by said processing means comprises a sign, an integer portion having at least one numeric symbol, a fractional portion having a variable number of numeric symbols specifiable by the user, and a decimal point between the integer and fractional portions, and the exponent produced by said processing means comprises a sign and an integer portion that has at least one numeric symbol and that is always a multiple of three.

6. The apparatus of claim 1 wherein the display means comprises an LED display for displaying the mantissa and exponent of the formatted data.

7. The apparatus of claim 1 including:
   a source for providing input data in floating-point notation;
   said storage means being coupled to said source for receiving and storing data therefrom in floating point notation; and
   said processing means being coupled to said storage means for formatting into engineering notation the data stored in floating-point notation.

8. The apparatus of claim 7 wherein:
   said storage means comprises three data registers coupled to said source for storing data received therefrom in response to the processing means; and
   said processing means comprises an adder unit and a memory unit with a routine stored therein, the adder unit being coupled to the memory unit and both the adder and memory units being coupled to at least one of the data registers for formatting into engineering notation the data stored in floating-point notation in said data register.

* * * * *

UNITED STATES PATENT AND TRADEMARK OFFICE
CERTIFICATE OF CORRECTION

PATENT NO. : 3,987,290
DATED : October 19, 1976
INVENTOR(S) : Peter D. Dickinson It is certified that error appears in the above-identified patent and that said Letters Patent are hereby corrected as shown below:

Column 4, line 9, after "C[X]" insert -- $\neq$ --;

Column 5, line 28, "In" should read -- If --; line 33, "Upon" should start new paragraph; line 54, after "this" insert -- exponent --;

Column 6, at approximately line 42, "B[(3-13)" should read -- $B_{(3-13)}$ --;

Column 7, line 17, "43" should read -- 42 --.

Signed and Sealed this

Eighteenth Day of January 1977

[SEAL]

Attest:

RUTH C. MASON
*Attesting Officer*

C. MARSHALL DANN
*Commissioner of Patents and Trademarks*